(12) United States Patent
Moon et al.

(10) Patent No.: US 7,146,134 B2
(45) Date of Patent: Dec. 5, 2006

(54) APPARATUS AND METHOD FOR DYNAMIC DIVERSITY BASED UPON RECEIVER-SIDE ASSESSMENT OF LINK QUALITY

(75) Inventors: Jaekyun Moon, Plymouth, MN (US); Younggyun Kim, Irvine, CA (US); Barrett J Brickner, Savage, MN (US); Paul C Edwards, San Francisco, CA (US); Michael E Butenhoff, Savage, MN (US)

(73) Assignee: DSP Group Inc., Santa Clara, CA (US)

( * ) Notice: Subject to any disclaimer, the term of this patent is extended or adjusted under 35 U.S.C. 154(b) by 475 days.

(21) Appl. No.: 10/117,456

(22) Filed: Apr. 4, 2002

(65) Prior Publication Data

US 2003/0153358 A1 Aug. 14, 2003

Related U.S. Application Data

(60) Provisional application No. 60/355,266, filed on Feb. 9, 2002.

(51) Int. Cl.
*H04B 17/00* (2006.01)
(52) U.S. Cl. .................. 455/67.11; 455/67.13; 455/101; 455/115.3
(58) Field of Classification Search ............. 455/575.6, 455/347–351, 101, 114.1, 115.1, 226.1, 67.11, 455/67.13, 562.1; 343/701, 702
See application file for complete search history.

(56) References Cited

U.S. PATENT DOCUMENTS

| 5,546,397 | A | | 8/1996 | Mahany |
| 5,732,113 | A | | 3/1998 | Schmidl et al. |
| 5,940,452 | A | * | 8/1999 | Rich ........................... 375/347 |
| 5,960,344 | A | | 9/1999 | Mahany |
| 6,144,711 | A | | 11/2000 | Raleigh et al. |
| 6,370,369 | B1 | * | 4/2002 | Kraiem et al. ........... 455/277.1 |
| 6,505,037 | B1 | | 1/2003 | Kandala |
| 2003/0002471 | A1 | * | 1/2003 | Crawford et al. ........... 370/343 |
| 2003/0151281 | A1 | * | 8/2003 | Dulin et al. ................ 370/328 |
| 2003/0152023 | A1 | * | 8/2003 | Hosur et al. ................ 370/208 |

FOREIGN PATENT DOCUMENTS

| EP | 1 045 531 A2 | 10/2000 |
| WO | WO 02/01749 A2 | 1/2002 |

* cited by examiner

*Primary Examiner*—Temica Beamer
(74) *Attorney, Agent, or Firm*—Shumaker & Sieffert, P.A.

(57) ABSTRACT

An apparatus for dynamic diversity signal reception based upon receiver-side link quality assessments includes two or more antennae. At least one switch is connected to the two or more antennae. A dynamic diversity controller is connected to the at least one switch. The dynamic diversity controller includes a link quality assessor to assess link quality and generate a link characterization value. A diversity configuration selector, responsive to the link characterization value, selectively activates the at least one switch to implement a dynamic diversity configuration. The link quality assessor includes a signal strength analyzer, a modem detector, and/or a MAC layer analyzer to assess the received signal and generate the link characterization value.

65 Claims, 8 Drawing Sheets

APPARATUS AND METHOD FOR DYNAMIC DIVERSITY BASED UPON RECEIVER-SIDE ASSESSMENT OF LINK QUALITY

This application claims priority to U.S. provisional patent application Ser. No. 60/355,266, filed Feb. 9, 2002, the entire content of which is incorporated herein by reference.

BRIEF DESCRIPTION OF THE INVENTION

This invention relates generally to wireless signal processing. More particularly, this invention relates to dynamic diversity selection based upon receiver-side link quality assessments.

BACKGROUND OF THE INVENTION

Diversity is a form of signal reception in which the output signals from two or more independent antennae are combined to provide a signal that is less likely to fade. Various diversity schemes are known in the art. By way of example, various diversity schemes will be discussed in connection with two receive antennae. Each of these diversity schemes is equally applicable to multiple receive antennae.

When there is only one antenna there is no diversity. A no diversity configuration allows for the simplest implementation and results in the lowest power consumption. On the other hand, in the absence of a diversity configuration, the received signal is vulnerable to fading.

In a switched diversity scheme, only one antenna is chosen at any given time during reception. The choice is based on some prescribed selection criterion. The antenna connection is switched when the perceived link quality falls below a certain prescribed threshold.

In a selection diversity scheme, the antenna with the largest signal-to-noise ratio (SNR) or signal power is utilized. The SNR or signal strength measurement can take place during a preamble period at the beginning of a received packet. In this scheme, a single antenna connection is maintained at most times, but both antennae connections are utilized while the SNRs or signal strengths are measured. The actual selection/switching process can take place between packet receptions. The selection process can be done on a packet-by-packet basis or can take place once in a number of receptions or during a prescribed time period.

In a full diversity scheme, both antennae are connected at all times. This mode consumes the largest power as both received paths must be powered up, but also offers the largest performance gain, especially in severe fading environments with large delay spread, compared to other configurations.

In sum, there are various advantages and disadvantages associated with each prior art diversity scheme. These advantages and disadvantages relate to tradeoffs between the quality of the signal reception and the amount of power consumed. For mobile wireless communication devices there are continuing pressures to reduce power consumption. Thus, it would be highly desirable to identify a technique for dynamically selecting a diversity configuration while optimizing signal reception and reducing power consumption.

SUMMARY OF THE INVENTION

An apparatus for dynamic diversity signal reception based upon receiver-side link quality assessments includes two or more antennae. At least one switch is connected to the two or more antennae. A dynamic diversity controller is connected to the at least one switch. The dynamic diversity controller includes a link quality assessor to assess link quality and generate a link characterization value. A diversity configuration selector, responsive to the link characterization value, selectively activates the at least one switch to implement a dynamic diversity configuration. The link quality assessor includes a signal strength analyzer, a modem detector, and/or a MAC layer analyzer to assess link quality and generate the link characterization value.

The invention also includes an apparatus to facilitate dynamic diversity signal reception. This apparatus has a bus, a control circuit connected to the bus, and input and output devices connected to the bus to route received link information and transmit control signals. A dynamic diversity control module is also connected to the bus. The dynamic diversity control module has a link quality assessor and a diversity configuration selector. The link quality assessor implements alternate or cumulative strategies to process the received link information and generate a link characterization value. Based upon the link characterization value, the diversity configuration selector activates a diversity configuration.

The invention also includes a method of dynamic diversity selection based upon receiver-side link quality assessments. The method includes receiving link information at a wireless mobile device. The link information is assessed using a technique selected from a signal strength analysis, a modem detection analysis, and a medium access control (MAC) analysis. An antenna diversity configuration is selected based upon the assessment of the link information.

There are a number of advantages associated with the technique of the invention. First, since the technique of the invention is implemented at the receiver, it does not interfere with traditional transmitter-side link-enhancing techniques, such as transmitter power control and packet retransmission. Second, the dynamic diversity technique of the invention allows the communication system to significantly enhance its ability to maintain a reliable link in adverse channel conditions without sacrificing the data transfer rate. The technique also allows a receiver to operate at an improved data rate under a given channel condition, compared to the conventional switched diversity, selection diversity or non-diversity configurations. The technique of the invention facilitates the consumption of considerably less power than a full diversity implementation without a significant sacrifice in throughput. Advantageously, the dynamic mode selection technique of the invention can utilize various physical (PHY) layer as well as medium access control (MAC) layer parameters to identify a change in the quality of the communication link.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
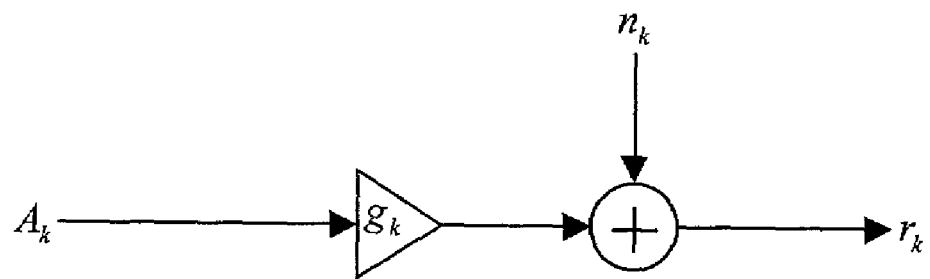
FIG. 1 illustrates a model of a wireless channel.

Consider the representative quadrature amplitude modulation (QAM) system depicted in FIG. 1. The received sample $r_k$ is given by $$r_k = g_k A_k + n_k \quad (1)$$

where $g_k$ represents the fading in the wireless medium, $A_k$ is the QAM symbol and $n_k$ is the additive noise. All variables are complex-valued in general. This is a general description of QAM symbols being transmitted over a fading channel corrupted by additive noise. As such, equation (1) can be either a time-domain or a frequency-domain model. In a practical wireless system that utilizes a finite number, say N, fixed frequency bins, the model of equation (1) is applied with an underlying assumption that the k-th symbol transmission occupies the (k modulo N)-th frequency bin. Bins are used in a successive manner from the first bin to the last one, and then back to the first one and so on. Among specific examples of the latter system are frequency division multiplexing (FDM) and orthogonal frequency division multiplexing (OFDM) systems.

Figure 2:
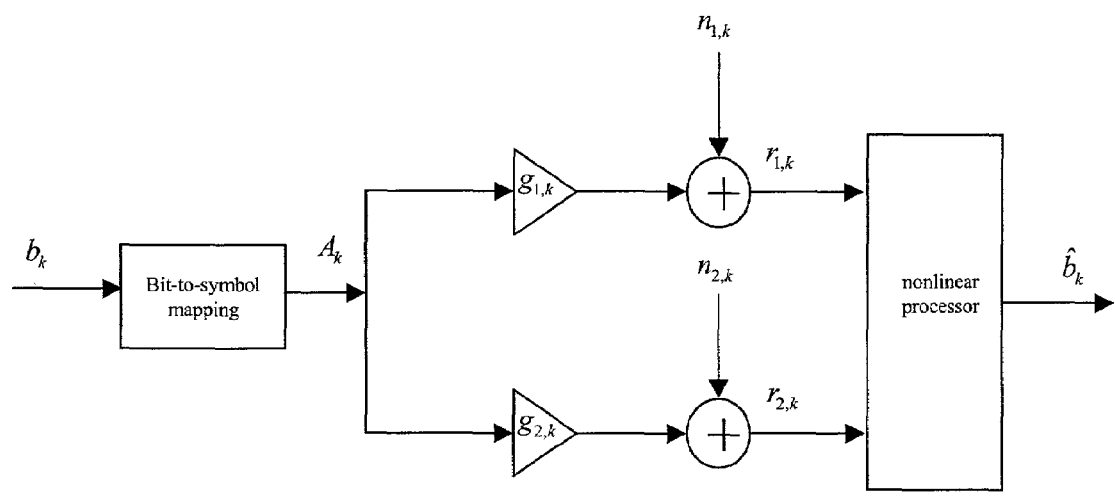
FIG. 2 illustrates a model of a wireless channel with two receive antennae.

Now consider the channel model of FIG. 2 that results from the use of one transmit antenna and two receive antennae. Extensions to multiple channels corresponding to multiple receive antennae and, possibly, multiple transmit antennae are straightforward to anyone skilled in the art. For standard-compliant applications such as wireless local area network (WLAN), compatibility with a basic transceiver/modem design must be ensured. For this reason, no transmit antenna diversity is assumed in this invention. The received samples for the two antennae are given by $$r_{1,k} = g_{1,k} A_k + n_{1,k} \quad (2a)$$

$$r_{2,k} = g_{2,k} A_k + n_{2,k} \quad (2b)$$

where the double subscript is used for the channel fade parameter and noise to distinguish between the two receive paths. Also shown in FIG. 2 is the bit-to-symbol mapping block, which converts a fixed number of bits into a QAM symbol and the nonlinear processor that produces decisions on the transmitted bits $\hat{b}_k$. These decisions can be either hard or soft. Various prior art implementations exist for this nonlinear processor.

In the context of the models of FIGS. 1 and 2, the present invention facilitates the dynamic and automatic selection of the receiver antennae diversity mode based on link quality assessment. In a conventional indoor WLAN, for example, the data rate of a given communication link is typically adjusted at the transmitter-side based on some measure of the successful packet transmission rate. As the channel condition gets worse (e.g., as the receiving station moves away from the transmitting station, or the antenna orientation changes in a mobile station), the link data rate is adjusted down to a lower rate, as the reliable communication at the initial rate is no longer feasible. Dynamic diversity enables a higher link rate in more adverse channel conditions than is possible in conventional systems, while avoiding excessive overall power consumption by the transceiver/modem components. In contrast to the conventional WLAN system based on transmitter-side link quality assessment, dynamic diversity requires a receiver-side link quality measure.

Figure 3:
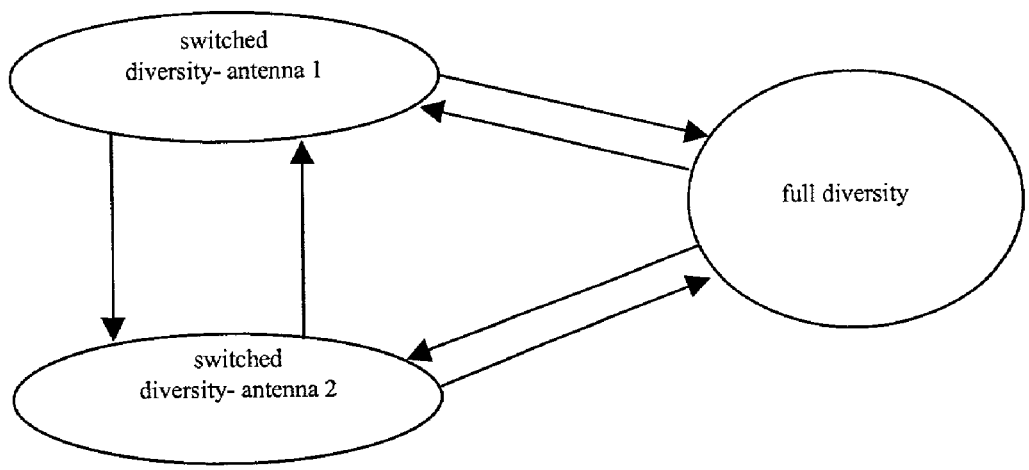
FIG. 3 illustrates a diversity configuration selection routine with full diversity and switched diversity modes in accordance with an embodiment of the invention.

FIG. 3 is a state transition diagram illustrating dynamic diversity control in accordance with an embodiment of the invention. This embodiment allows dynamic diversity selection between the low power switched diversity mode and the high performance, full diversity mode. Observe in FIG. 3 that each antenna can alternately operate in a switched diversity mode and a full diversity mode.

Figure 4:
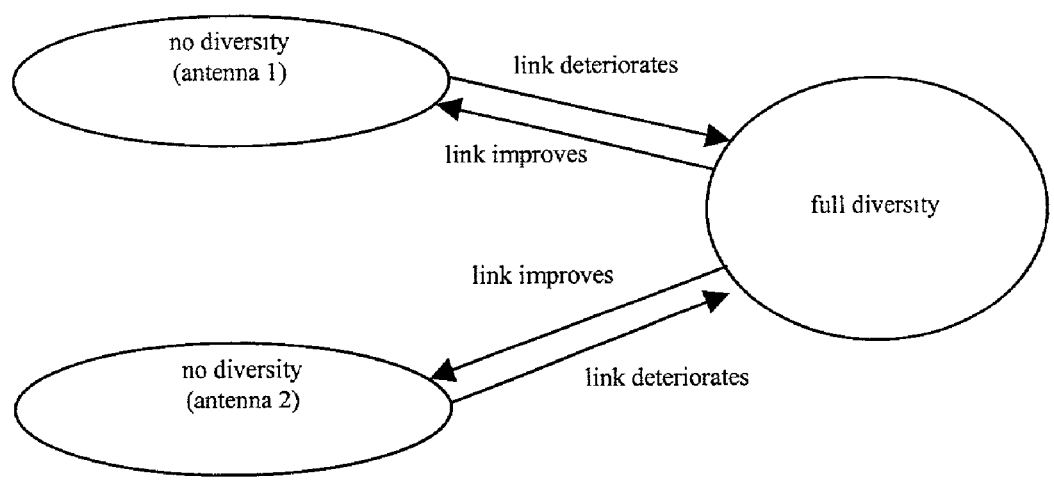
FIG. 4 illustrates a diversity configuration selection routine with full diversity and no diversity modes in accordance with an embodiment of the invention.

FIG. 4 is a state transition diagram illustrating dynamic diversity control in accordance with an alternate embodiment of the invention. This embodiment allows dynamic transition between full diversity and no diversity. As the link quality deteriorates, the receiver transitions from a single antenna connection to the full diversity mode. The transition back to a single antenna connection is triggered by an indication of significantly improved link quality. When going back to a single antenna configuration, comparison of the received signal strengths in the two antennae paths leads to a preferable antenna connection. In this sense, the scheme of FIG. 4 also incorporates a "slow" form of selection diversity.

Figure 5:
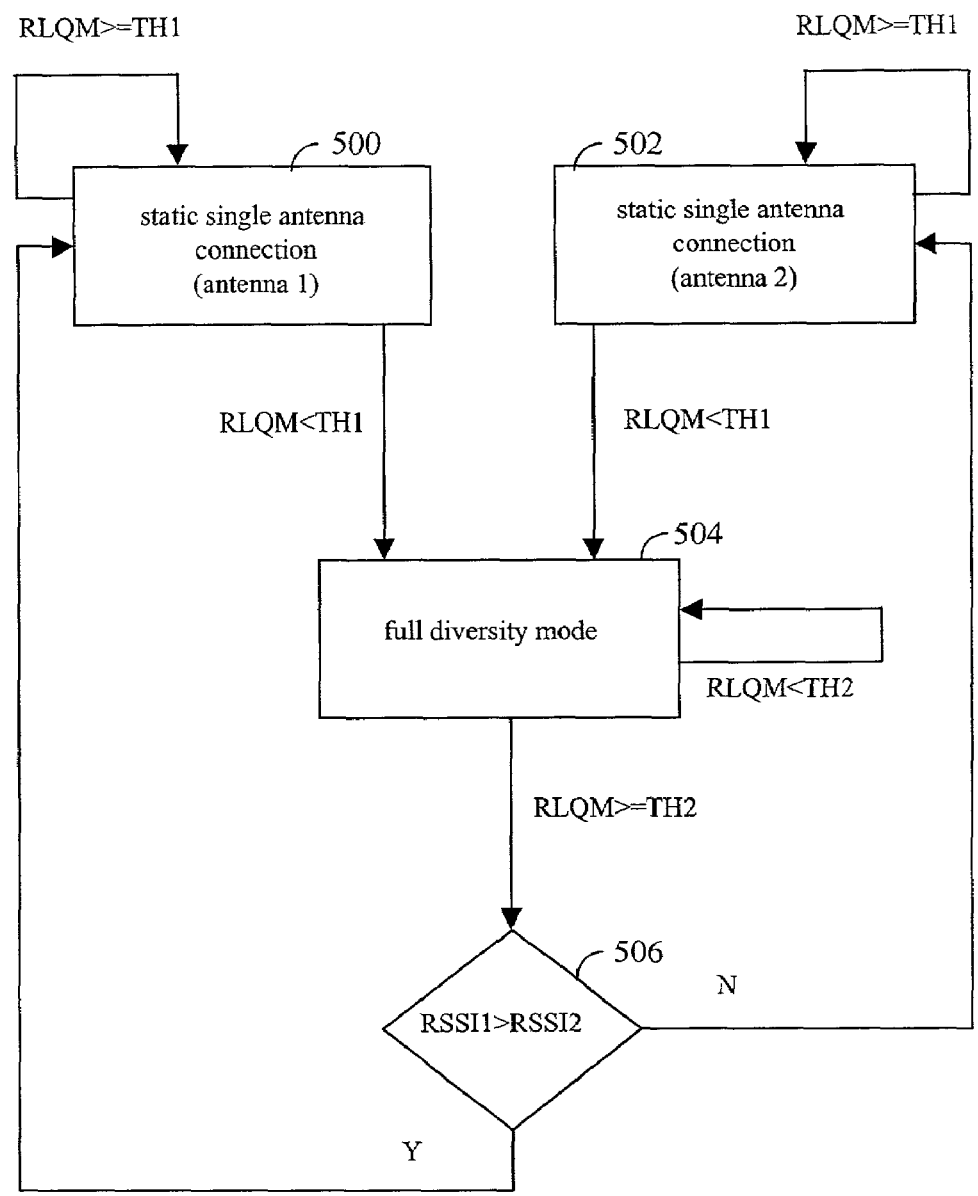
FIG. 5 illustrates a diversity configuration selection routine utilized in accordance with an embodiment of the invention.

FIG. 5 is a flow chart description of the dynamic diversity controller depicted in FIG. 4. RLQM stands for the receiver-side link quality measure and RSSI is the receive signal strength indicator. If the RLQM at the first antenna is greater than or equal to a first threshold (TH1), then the connection is maintained at the first antenna (block 500). Similarly, if the RLQM at the second antenna is greater than or equal to the first threshold (TH1), then the connection is maintained at the second antenna (block 502).

If the RLQM is beneath the first threshold (TH1), then the full diversity mode is entered at block 504. This mode is maintained as long as the RLQM is beneath a second threshold (TH2). When the RLQM is greater than or equal to the second threshold (TH2), then a decision is made at block 506. If the receive signal strength indicator for the first antenna (RSSI1) is greater than the receive signal strength indicator for the second antenna (RSSI2), then control proceeds to block 500, otherwise control proceeds to block 502.

In an effort to reduce power consumption further, the full diversity mode can be disabled at the end of packet reception and until detection of a new packet. As soon as the arrival of a new packet is detected, full diversity can resume, unless the most recent link quality measure indicates a sufficient margin and thus suggests switching to the low power antenna mode.

As shown in FIG. 5, transition between diversity modes and/or antennae connections is signaled by a change in the perceived link quality level. The transmit-side link quality assessment is typically based on the estimated dropped packet rate via the observation of the acknowledgement packet and the number of retries attempted. However, the link quality assessment at the receiver-side, as required for dynamic diversity, must rely on different methods. Receiver-side link quality assessment may be performed using various techniques associated with the invention. In particular, the invention can utilize a signal strength analyzer, a modem detector, and/or a MAC layer analyzer to perform receiver-side link quality assessment, as discussed below.

In accordance with an embodiment of the invention, a signal strength analyzer assesses received signal strength (RSS). RSS is a measure of the average signal power and is relatively easy to estimate. The RSS signal can be combined with a measure of delay spread or multi-path interference to provide an accurate link quality estimate. In OFDM the coherence bandwidth (the reciprocal of the delay spread) of the multi-path channel can be measured from the frequency correlation function that is approximated as $$\phi_n = \frac{\frac{1}{N-n}\sum_{k=n+1}^{N}|H_k||H_{k-n}|}{\frac{1}{N}\sum_{k=1}^{N}|H_k|^2} \qquad (3)$$

where $H_k$ represents the frequency response of the channel and N is the total number of subcarriers. The 50% coherence bandwidth, denoted as $B_{50}$, can be defined as the width of this frequency correlation function at 50% of the peak. The rms delay spread is roughly approximated as $$\tau_{rms} \approx \frac{1}{5B_{50}}. \qquad (4)$$

A simpler way of estimating the coherence bandwidth is to look at the overall deviation of the frequency response from an average value. For example, one can compute $$\sum_{k=1}^{N}[|H_k|-S]^2/S^2 \qquad (5)$$

or $$\sum_{k=1}^{N}||H_k|-S|/S \qquad (6)$$

where $S=(1/N)\Sigma_{k=1}^{N}|H_k|$. The delay spread can also be estimated by measuring the accumulated differences of the adjacent tones. For example, the rms delay spread can be related to $$\sum_{k=L+1}^{N}||H_k|^2-|H_{k-L}|^2|/\sum_{k=1}^{N}|H_k|^2, \qquad (7)$$

where L is 1 or a small positive integer. The denominator of (7) is simply a constant and thus can be ignored under a proper operation of the automatic gain control circuitry. Other possible variations of utilizing the differences of neighboring tones include obtaining $$\sum_{k=L+1}^{N}||H_k|-|H_{k-L}||^2/\sum_{k=1}^{N}|H_k|^2. \qquad (8)$$

or $$\sum_{k=L+1}^{N}||Re\{H_k\}|+|Im\{H_k\}|-|Re\{H_{k-L}\}|-|Im\{H_{k-L}\}||/\sum_{k=1}^{N}(|Re\{H_k\}|+|Im\{H_k\}|). \qquad (9)$$

The denominator of (9) can also be assumed to be a constant. These quantities can be used as a rough measure of delay spread. The multi-path effect on the overall detection performance can also be estimated by observing the number of subcarriers whose signal strength falls below a certain threshold. Given the built-in, forward error correction capability, this is a reliable measure of the multi-path effect. Once the delay spread or multi-path effect is estimated, it can be used together with other information such as the date rate, the RSSI, and the noise variance estimate to obtain a reasonable estimate for the bit or packet error rate of the current link.

A modem detector may also be used in accordance with the invention to assess link quality. In particular, a detection quality measure (DQM) can be observed within the modem. For example, the detection quality is reflected in the magnitudes of the soft decisions captured at the Viterbi detector input, e.g., the average of $1/[1+exp(|L_i|)]$, where $L_i$ is the soft decision for the ith bit. These soft decisions can be used to estimate the bit error rate.

Since the functional relationship between such a DQM and the bit error rate or the packet error rate can be obtained empirically, the DQM can drive the mode selection and/or the antenna selection.

Examination of the internal Viterbi detector parameters also provides a useful measure of the detection quality. As an example, a consistently small difference between the best survivor path metric and that of the second best contender indicates that the Viterbi detector operates without much confidence and thus the decision quality is not highly reliable.

A frequent disagreement among the surviving paths in making a bit decision is another indication of a relatively poor packet reception quality. If the detection quality is good, all or the overwhelming majority of the survivor paths will point to the same bit decision. On the other hand, when the Viterbi detector operates in a harsh link condition, the survivor paths will tend to dispute frequently in making their bit decisions. No matter which method is adopted, the MAC layer functions must always verify the Receiver Address (RA) field in the MAC header to ensure that the packets are intended for the receiving station under consideration.

A MAC layer analyzer may also be used in accordance with an embodiment of the invention to assess link quality. The MAC layer analyzer assesses link quality by relying upon MAC layer parameters. One method applicable to WLAN is to examine the Retry Subfield in the MAC header of the received packet and observe the number of retries attempted. As the number of retries on a given packet reaches a certain threshold, the antenna connection or the diversity mode can be changed in hopes of establishing a better link. This approach can be combined with the CRC check result. A failed CRC check would indicate an impending attempt of another retry and thus can be used to accelerate the decision making process. The problem here is, however, that with a failed CRC check, it would not be clear if the packet was intended for the receiving station under question since the RA field could be contaminated with erroneous bits. One way to get around this difficulty is to assume that the probability of getting an error in the RA field is negligible and simply treat the decoded RA as the true intended address. This assumption will be correct in most cases since the packet size will almost always be very large compared to the RA field and the probability of an error in the RA field is considerably smaller than elsewhere in the packet. The MAC layer parameters are quite convenient as the link quality can be assessed independent of the data rate or multi-path effects.

A particularly efficient way of implementing the proposed dynamic diversity concept is to utilize both MAC and PHY layer parameters. For example, the receiver can rely on the inspection of the Retry Subfield to sense degradation in the link quality and signal a transition to the full diversity mode. On the other hand, the reverse transition from the full diversity mode to the simpler antenna setting can be triggered when the RSS level increases by some prescribed amount (which could be a data-rate-dependent value).

When there is a user overwrite in favor of high performance or the station is connected to a permanent power source, the dynamic mode selection feature can be disabled and the receiver can stay in the fall diversity mode. On the other hand, if the user desires the lowest power consumption, then the receiver can remain in the simpler diversity mode.

The invention utilizes a diversity configuration selector to select an antenna whose receive path yields the larger SNR or signal power. The SNR or signal strength measurement can take place during a relatively short preamble period at the beginning of the packet. Once a comparison is made, only the stronger antenna connection is maintained for the rest of the packet. To minimize power consumption, it is desired to have only one receive path turned on during the listen periods, where the receiver is only monitoring the incoming signal level. The difficulty then is to determine the timing of a packet arrival to turn on both antenna connections. One way of handling this is to turn on the other antenna connection as soon as the arrival of a packet is detected. Once the selection is made based on RSSI measurements, the antenna with a lesser RSS can be disconnected.

Another method is to rely on the beacon packets that are released periodically by the access point (AP) and addressed to every station in its network. Since the arrival times of the beacon packets are roughly known in advance, both antenna paths can be turned on in anticipation of these packets. Once the MAC layer verifies the beacon packet, the antenna selection can be made based on the RSSI measurements made during the beacon reception. Similarly, antenna selection can also be made based on RSSI measurements during the reception of an acknowledgement packet. This method will also work if the receiving station under consideration also engages in transmission on a regular basis. Once the packet is transmitted, the arrival time of the acknowledgement packet can be predicted within a reasonable range.

Figure 6:
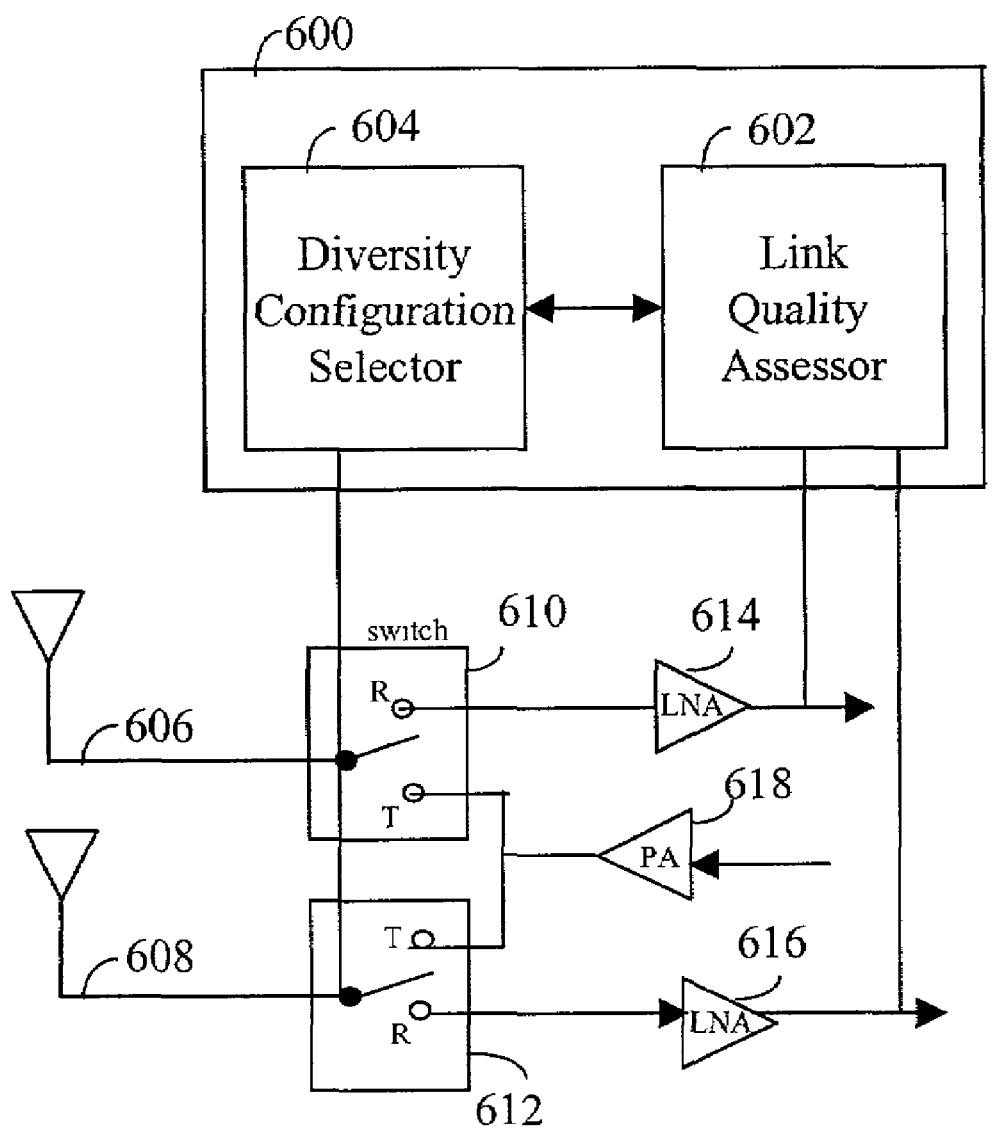
FIG. 6 illustrates a link quality assessor, diversity configuration selector, and switch configuration utilized in accordance with an embodiment of the invention.

FIG. 6 illustrates a dynamic diversity controller 600 utilized to implement the techniques of the invention. The dynamic diversity controller 600 includes a link quality assessor 602. As discussed below, the link quality assessor 602 may include a signal strength analyzer, a modem detector, and/or a MAC layer analyzer to assess link quality and generate a link characterization value, which is passed to the diversity selection controller 604. The link characterization value or link information can include the receiver-side link quality measure (RLQM) and the receive signal strength indicator (RSSI). Standard circuitry can be utilized to generate this information The diversity configuration selector 604 processes the link characterization value to identify a diversity configuration, which is implemented through a control signal or control signals generated by the diversity configuration selector 604. The link quality assessments discussed above are used individually or in combination to generate the link characterization value.

As discussed above, the link quality assessor 602 may utilize a variety of signal assessment strategies. For example, the link quality assessor may process time domain samples or frequency domain values. In one embodiment, the link quality assessor includes N fixed frequency bins, where the k-th symbol transmission occupies the (k modulo N)-th frequency bin. The link quality assessor 602 may also measure orthogonal frequency division multiplexing (OFDM) coherence bandwidth to produce a delay spread estimate. OFDM coherence bandwidth may also be assessed from a frequency correlation function to produce a delay spread estimate. OFDM coherence bandwidth may also be assessed from an overall deviation of frequency response from an average value to produce a delay spread estimate. The link quality assessor can also be configured to measure the accumulated differences of immediately adjacent tones to produce a delay spread estimate. Further, the number of subcarriers whose signal strength falls below a threshold may be used to produce a delay spread estimate.

As previously indicated, the modem detector 812 of the link quality assessor 602 may utilize a variety of strategies.

For example, the modem detector 812 may be configured to measure magnitudes of soft decisions captured at the input of a Viterbi detector. The modem detector can also measure internal Vierbi detector parameters. The modem detector may also identify disagreement between surviving signal paths in a Viterbi detector.

The MAC layer analyzer 814 of the link quality assessor 602 may also utilize a number of the previously discussed strategies. For example, the MAC layer analyzer 814 may examine MAC layer parameters to assess link quality. The MAC layer analyzer 814 can assess the quality of the link using a MAC analysis that examines Wireless Local Area Network (WLAN) retry sub-fields in a MAC header. The MAC layer analyzer 814 can also assess the quality of the link using a MAC analysis that examines WLAN retry sub-fields in a MAC header and a CRC check result. In addition, the MAC analyzer 814 can examine MAC parameters and a modem detector that examines physical (PHY) layer parameters.

The link characterization value is processed by the diversity configuration selector 604 according to one or more of the diversity selection techniques discussed above. That is, the diversity configuration selector 604 may utilize one or more of the strategies discussed in connection with FIGS. 3–5.

The dynamic diversity controller 600 is connected to antennae and switches. In particular, FIG. 6 illustrates a first antenna 606 and a second antenna 608, respectively connected to switches 610 and 612. The switches 610 and 612 operate in response to a control signal from the diversity configuration selector 604. Amplifiers 614 and 616 preferably process the outputs from the switches 610 and 612. The link quality assessor 602 processes the amplifier output signals. An amplifier 618 boosts the transmission signal.

During reception or listen periods, the diversity configuration selector 604 connects at least one switch 610 or 612 to the receive node R. While in full diversity, both switches 610 and 612 are connected to receive nodes R. In the lower-power diversity mode, only one switch is connected to a receive node R under the control of the diversity selection controller 604. For transmission, either switch (or possibly both switches) are closed to the transmit (T) position.

Figure 7:
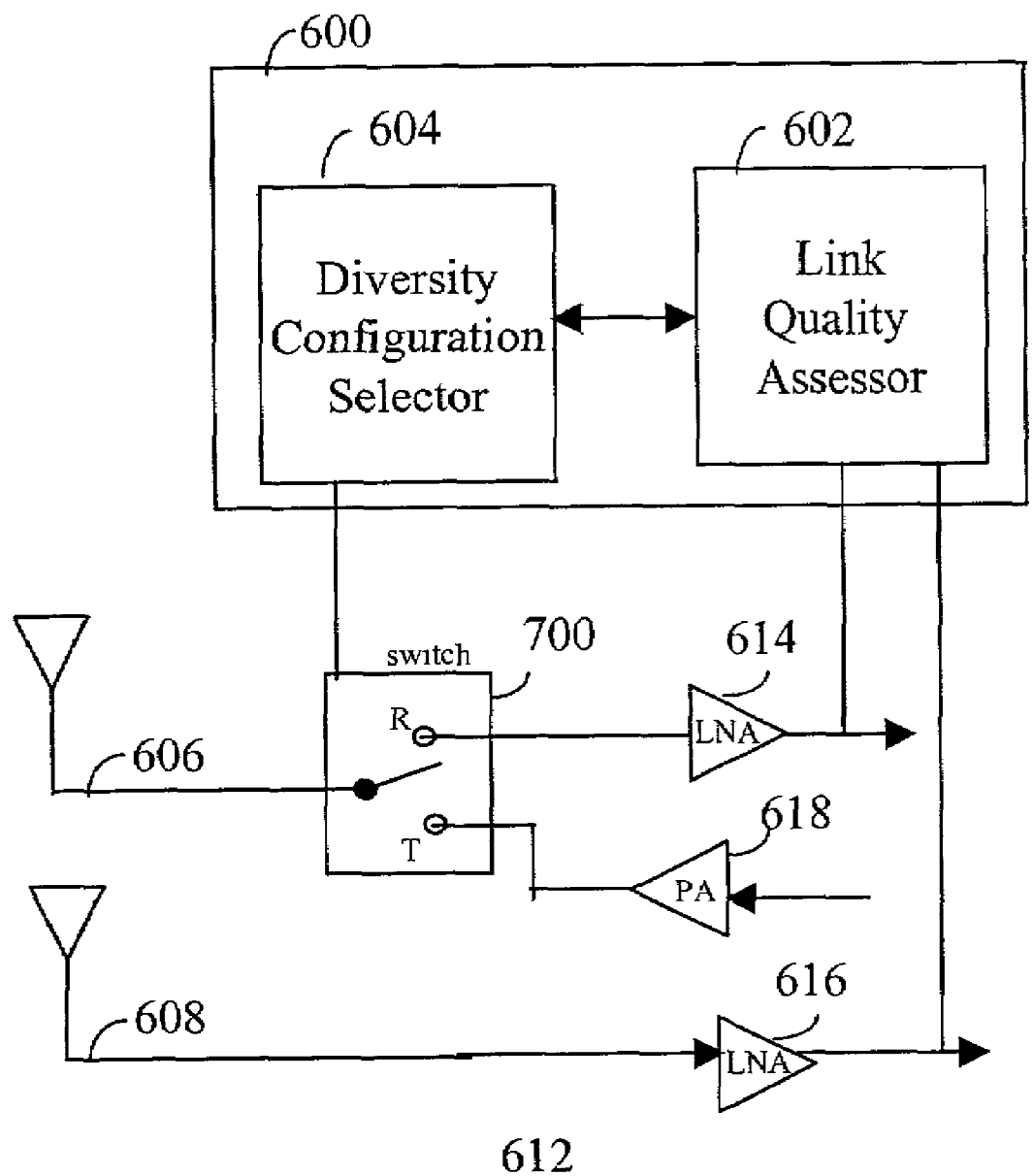
FIG. 7 illustrates a link quality assessor, diversity selection controller, and switch configuration utilized in accordance with an alternate embodiment of the invention.

FIG. 7 illustrates a more efficient implementation of antenna switching. There is only one transmission/receive switch 700. For transmission, the switch 700 moves to the T position and only antenna 606 is used. During reception or the listening mode the switch is set at R. Thus, ostensibly both paths are connected during reception or listen periods. However, to effectively achieve the desired antenna switching/selection during reception, a control signal simply turns the power up/down (or on/off) for the entire radio frequency (RF) and analog path including analog-to-digital converters (not shown). This eliminates the need for an extra switch and avoids the signal loss associated with it.

Figure 8:
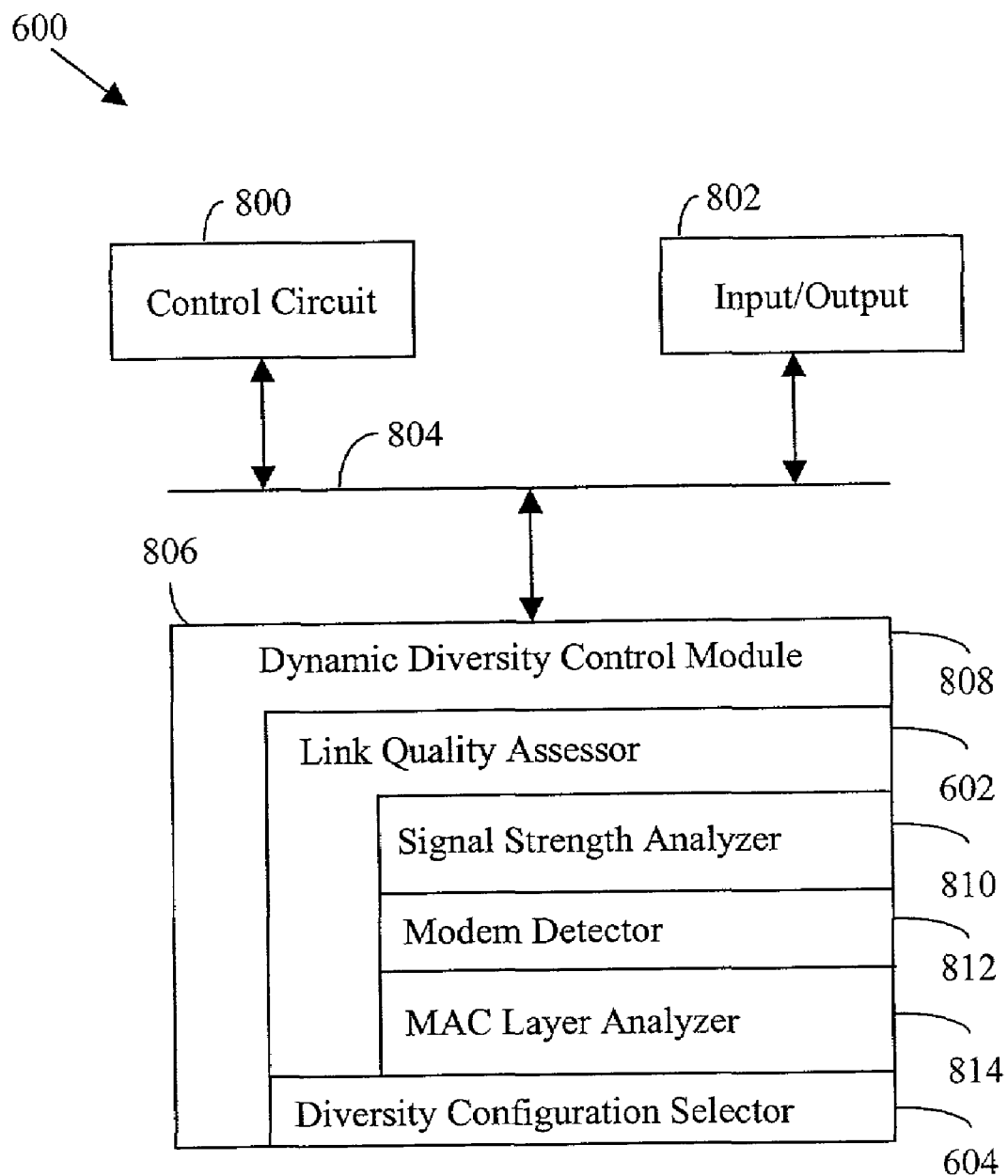
FIG. 8 illustrates an embodiment of a dynamic diversity controller with a link quality assessor and a diversity configuration selector utilized in accordance with an embodiment of the invention.

FIG. 8 illustrates an embodiment of the dynamic diversity controller 600. In this embodiment, the dynamic diversity controller 600 includes a control circuit (e.g., a microprocessor) 800 connected to a set of input and output devices 802 via a bus 804. A memory module (e.g., primary and/or secondary memory) 806 is also connected to the bus 804. A dynamic diversity control module 808 is stored in the memory 806. The dynamic diversity control module 808 includes a set of executable instructions to implement the operations of the link quality assessor 602 and the diversity configuration selector 604. In one embodiment, the link quality assessor 602 includes a signal strength analyzer 810 to implement the signal strength assessments techniques discussed above. The link quality assessor 602 also includes a modem detector 812 to implement the modem detection techniques discussed above. In addition, a MAC layer analyzer 814 is used to implement the MAC analysis techniques discussed above. The diversity configuration selector 604 implements one or more of the diversity selection operations discussed above in connection with FIGS. 3–5.

The configuration of FIG. 8 is exemplary. The dynamic diversity controller 600 may also be implemented as a hardwired circuit, an Application Specific Integrated Circuit (ASIC), a programmable logic device, and the like.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus for dynamic diversity signal reception based upon receiver-side link quality assessment, comprising:
   two or more antennae;
   at least one switch connected to said two or more antennae; and
   a dynamic diversity control module connected to said at least one switch, said dynamic diversity control module including
      a link quality assessor to assess a received signal and generate a link characterization value, and
      a diversity configuration selector, responsive to said link characterization value, to selectively activate said at least one switch to implement a dynamic diversity configuration to switch between a switched diversity mode and a full diversity mode.

2. The apparatus of claim 1 wherein said link quality assessor processes said received signal as time-domain samples.

3. The apparatus of claim 1 wherein said link quality assessor processes said received signal as frequency-domain samples.

4. The apparatus of claim 1 wherein said link quality assessor processes said received signal as frequency-domain samples, said link quality assessor including N fixed frequency bins, wherein the k-th symbol transmission occupies the (k modulo N)-th frequency bin.

5. The apparatus of claim 1 wherein said link quality assessor includes a signal strength analyzer.

6. The apparatus of claim 1 wherein said link quality assessor measures orthogonal frequency division multiplexing (OFDM) coherence bandwidth to produce a delay spread estimate.

7. The apparatus of claim 1 wherein said link quality assessor measures orthogonal frequency division multiplexing coherence bandwidth from a frequency correlation function to produce a delay spread estimate.

8. The apparatus of claim 1 wherein said link quality assessor measures orthogonal frequency division multiplexing coherence bandwidth from an overall deviation of frequency response from an average value to produce a delay spread estimate.

9. The apparatus of claim 1 wherein said link quality assessor measures the accumulated differences of adjacent tones to produce a delay spread estimate.

10. The apparatus of claim 1 wherein said link quality assessor observes the number of sub-carriers whose signal strength falls below a threshold to produce a delay spread estimate.

11. An apparatus for dynamic diversity signal reception based upon receiver-side link quality assessment, comprising:
   two or more antennas;
   a link quality assessor to assess a received signal; and
   a diversity configuration selector to selectively activate one of a plurality of diversity antenna configurations based on the assessment, wherein said link quality assessor includes a modem detector to measure soft decisions captured at the input of a Viterbi detector, measure internal parameters of the Viterbi detector, or identify disagreement between surviving signal paths in the Viterbi detector.

12. The apparatus of claim 1 wherein said link quality assessor includes a modem detector to measure internal Viterbi detector parameters.

13. The apparatus of claim 1 wherein said link quality assessor includes a modem detector to identify disagreement between surviving signal paths in a Viterbi detector.

14. An apparatus for dynamic diversity signal reception based upon receiver-side link quality assessment, comprising:
   two or more antennas;
   a link quality assessor to assess a received signal; and
   a diversity configuration selector to selectively activate one of a plurality of diversity antenna configurations based on the assessment, wherein said link quality assessor includes a MAC layer analyzer to examine MAC layer parameters to assess link quality.

15. The apparatus of claim 14, wherein said MAC analysis examines both Wireless Local Area Network (WLAN) retry sub-fields in a MAC header and a CRC check result.

16. The apparatus of claim 14 wherein said link quality assessor includes a modem detector that examines physical (PHY) layer parameters.

17. The apparatus of claim 1 wherein said diversity configuration selector generates control signals for said at least one switch to selectively implement the switched diversity mode and the full diversity mode.

18. The apparatus of claim 1 wherein said diversity configuration selector generates control signals for said at least one switch to selectively transition from no diversity to the full diversity mode.

19. The apparatus of claim 1 wherein said diversity configuration selector receives a receiver-side link quality measure and a receive signal strength indicator from said link quality assessor.

20. The apparatus of claim 1 wherein only one antenna is turned on during signal listen periods.

21. The apparatus of claim 1 wherein said two antennae are turned on automatically at the beginning of each received packet.

22. The apparatus of claim 1 wherein diversity configuration selection is made at the end of a preamble period of each received packet.

23. The apparatus of claim 1 wherein link quality assessment is based on examination of beacon packets released by a WLAN access point.

24. The apparatus of claim 1 wherein link quality assessment is based on examination of acknowledgment packets released by a WLAN transmitter.

25. An apparatus for dynamic diversity signal reception based upon receiver-side link quality assessments, comprising:
   two antennae;
   a single switch connected to one of said two antennae; and
   a dynamic diversity control module connected to said single switch, said dynamic diversity control module including:
      a link quality assessor to assess link information received from said two antennae and generate a link characterization value, and
      a diversity configuration selector, responsive to said link characterization value, to selectively activate said switch to implement a dynamic diversity configuration to switch between a switched diversity mode and a full diversity mode.

26. The apparatus of claim 25 wherein said dynamic diversity control module turns power on and off for the entire radio frequency and analog signal paths.

27. An apparatus to facilitate dynamic diversity signal reception, comprising:
   a bus;
   a control circuit connected to said bus;
   input and output devices connected to said bus to route received signal information and transmit a control signal; and
   a dynamic diversity control module connected to said bus, said dynamic diversity control module including a link quality assessor and a diversity configuration selector responsive to the link quality assessor to switch between a switched diversity mode and a full diversity mode.

28. The apparatus of claim 27 wherein said link quality assessor includes a signal strength analyzer to process said received signal information and generate a link characterization value that is processed by said diversity configuration selector to generate a control signal to facilitate dynamic diversity signal reception.

29. The apparatus of claim 27 wherein said link quality assessor includes a modem detector to process said received signal information and generate a link characterization value that is processed by said diversity configuration selector to generate a control signal to facilitate dynamic diversity signal reception.

30. The apparatus of claim 27 wherein said link quality assessor includes a medium access control (MAC) layer analyzer to process said received signal information and generate a link characterization value that is processed by said diversity configuration selector to generate a control signal to facilitate dynamic diversity signal reception.

31. The apparatus of claim 27 wherein said diversity configuration selector facilitates selective transitions from no diversity to full diversity configurations.

32. A method of dynamic diversity selection based upon receiver-side link quality assessments, comprising:
   receiving a wireless signal at a wireless mobile device;
   assessing link quality using a technique selected from a signal strength analysis, a modem detection analysis, and a medium access control (MAC) analysis; and switching between a switched diversity mode and a full diversity mode antenna diversity configuration based upon the assessed link quality.

33. The method of claim 32 wherein assessing includes assessing link quality using a signal strength analysis.

34. The method of claim 32 wherein assessing includes assessing link quality by measuring orthogonal frequency division multiplexing coherence bandwidth.

35. The method of claim 32 wherein assessing includes measuring orthogonal frequency division multiplexing coherence bandwidth from a frequency correlation function.

36. The method of claim 32 wherein assessing includes measuring orthogonal frequency division multiplexing coherence bandwidth from an overall deviation of frequency response from an average value.

37. The apparatus of claim 32 wherein assessing includes measuring the accumulated differences of adjacent tones.

38. The apparatus of claim 32 wherein assessing includes observing the number of subcarriers whose signal strength falls below a threshold.

39. The method of claim 32 wherein assessing includes assessing link quality using a modem detection analysis measuring soft decisions captured at the input of a Viterbi detector.

40. A method of dynamic diversity selection based upon receiver-side link quality assessments, comprising:
receiving a wireless signal at a wireless mobile device;
assessing link quality using a modem detection analysis; and
selecting an antenna diversity configuration based upon said assessing, wherein assessing includes assessing link quality using the modem detection analysis to measure internal Viterbi detector parameters, measure soft decisions captured at the input of a Viterbi detector, or identify disagreement between surviving signal paths in a Viterbi detector.

41. The method of claim 32 wherein assessing includes assessing link quality using a modem detection analysis identifying disagreement between surviving signal paths in a Viterbi detector.

42. A method of dynamic diversity selection based upon receiver-side link quality assessments, comprising:
receiving a wireless signal at a wireless mobile device;
assessing link quality using a medium access control (MAC) analysis; and
selecting an antenna diversity configuration based upon said assessing, wherein assessing includes assessing link quality using the MAC analysis to examine MAC layer parameters to assess link quality.

43. The method of claim 42 wherein the MAC analysis examines both Wireless Local Area Network (WLAN) retry sub-fields in a MAC header and a CRC check result.

44. The method of claim 32 wherein assessing includes assessing link quality using a MAC analysis that examines MAC parameters and a modem detection analysis that examines physical (PHY) layer parameters.

45. The method of claim 32 wherein selecting includes choosing a full diversity mode when said link quality falls below a full diversity mode threshold value.

46. The method of claim 45 wherein selecting includes identifying when said link quality rises above a full diversity mode transition threshold value.

47. The method of claim 46 further comprising identifying the larger of a first antenna receive signal strength indicator and a second antenna receive signal strength indicator.

48. The method of claim 47 further comprising selecting a first antenna single static connection configuration when said first antenna receive signal strength indicator is larger than said second antenna receive signal strength indicator.

49. The method of claim 48 further comprising maintaining said first antenna single static connection configuration while a first antenna receiver-side link quality measure value is above a threshold value.

50. The method of claim 47 further comprising selecting a second antenna single static connection configuration when said second antenna receive signal strength indicator is larger than said first antenna receive signal strength indicator.

51. The method of claim 50 further comprising maintaining said second antenna single static connection configuration while a second antenna receiver-side link quality measure value is above a threshold value.

52. The apparatus of claim 1, wherein the link quality assessor includes a modem detector to measure soft decisions captured at the input of a Viterbi detector, measure internal parameters of the Viterbi detector, or identify disagreement between surviving signal paths in the Viterbi detector.

53. The apparatus of claim 1, wherein the link quality assessor includes a MAC layer analyzer to examine MAC layer parameters to assess link quality.

54. The apparatus of claim 53, wherein the MAC layer analyzer uses a MAC analysis that examines Wireless Local Area Network (WLAN) retry sub-fields in a MAC header.

55. The apparatus of claim 11, wherein the modem detector measures magnitudes of the soft decisions.

56. The apparatus of claim 14, wherein the MAC layer analyzer uses a MAC analysis that examines Wireless Local Area Network (WLAN) retry sub-fields in a MAC header.

57. The apparatus of claim 25, wherein the link quality assessor includes a modem detector to measure soft decisions captured at the input of a Viterbi detector, measure internal parameters of the Viterbi detector, or identify disagreement between surviving signal paths in the Viterbi detector.

58. The apparatus of claim 25, wherein the link quality assessor includes a MAC layer analyzer to examine MAC layer parameters to assess link quality, wherein the MAC layer analyzer uses a MAC analysis that examines Wireless Local Area Network (WLAN) retry sub-fields in a MAC header.

59. The apparatus of claim 27, wherein the link quality assessor includes a modem detector to measure soft decisions captured at the input of a Viterbi detector, measure internal parameters of the Viterbi detector, or identify disagreement between surviving signal paths in the Viterbi detector.

60. The apparatus of claim 27, wherein the link quality assessor includes a MAC layer analyzer to examine MAC layer parameters to assess link quality, wherein the MAC layer analyzer uses a MAC analysis that examines Wireless Local Area Network (WLAN) retry sub-fields in a MAC header.

61. The method of claim 32, wherein assessing includes assessing link quality using a modem detection analysis to measure soft decisions captured at the input of a Viterbi detector, measure internal parameters of the Viterbi detector, or identify disagreement between surviving signal paths in the Viterbi detector.

62. The method of claim 32, wherein assessing includes assessing link quality using a MAC layer analysis to examine MAC layer parameters to assess link quality, wherein the MAC layer analysis examines Wireless Local Area Network (WLAN) retry sub-fields in a MAC header.

63. The method of claim 39, wherein the modem detection analysis measures magnitudes of the soft decisions.

64. The method of claim 40, wherein the modem detection analysis measures magnitudes of the soft decisions.

65. The method of claim 42, wherein the MAC layer analysis examines Wireless Local Area Network (WLAN) retry sub-fields in a MAC header.

* * * * *

UNITED STATES PATENT AND TRADEMARK OFFICE
CERTIFICATE OF CORRECTION

PATENT NO. : 7,146,134 B2
APPLICATION NO. : 10/117456
DATED : December 5, 2006
INVENTOR(S) : Moon et al.

It is certified that error appears in the above-identified patent and that said Letters Patent is hereby corrected as shown below:

On column 6, line 11, "$S=(1/N)\Sigma_{k=1}^{N}|H_k|.$" should read -- $S = (1/N.) \sum_{k=1}^{N} |H_k|.$ --

On Column 9, line 4, "Vierbi" should read --Viterbi--

Signed and Sealed this

Sixth Day of March, 2007

JON W. DUDAS
*Director of the United States Patent and Trademark Office*

UNITED STATES PATENT AND TRADEMARK OFFICE
CERTIFICATE OF CORRECTION

PATENT NO. : 7,146,134 B2
APPLICATION NO. : 10/117456
DATED : December 5, 2006
INVENTOR(S) : Moon et al.

It is certified that error appears in the above-identified patent and that said Letters Patent is hereby corrected as shown below:

On column 6, line 11, "S=(1/N)$\Sigma_{k=1}^{N}$ | $H_k$ | ." should read -- $S = (1/N) \sum_{k=1}^{N} |H_k|$ .--

On Column 9, line 4, "Vierbi" should read --Viterbi--

This certificate supersedes Certificate of Correction issued March 6, 2007.

Signed and Sealed this

Twelfth Day of June, 2007

JON W. DUDAS
*Director of the United States Patent and Trademark Office*